United States Patent [19]

Segall

[11] Patent Number: 5,050,792
[45] Date of Patent: Sep. 24, 1991

[54] FLOPPY DISK DIRECTORY ENVELOPE FORM

[75] Inventor: Peter L. Segall, New York, N.Y.

[73] Assignee: JMS Enterprises, Inc., Conn.

[21] Appl. No.: 644,680

[22] Filed: Jan. 22, 1991

Related U.S. Application Data

[63] Continuation of Ser. No. 119,137, Nov. 10, 1987, abandoned, which is a continuation-in-part of Ser. No. 860,500, May 7, 1986, Pat. No. 4,708,285.

[51] Int. Cl.⁵ .............................................. B65D 27/00
[52] U.S. Cl. ...................................... 229/68 R; 229/70; 229/74; 229/92.8
[58] Field of Search ................... 229/68 R, 69, 74, 75, 229/92.8

[56] References Cited

U.S. PATENT DOCUMENTS

| | | | |
|---|---|---|---|
| 2,145,500 | 1/1939 | Townsend | 229/68 R |
| 3,088,653 | 5/1963 | Swartz, Jr. | 229/68 R |
| 3,170,620 | 2/1965 | Nirenstein | 229/68 R |
| 3,368,741 | 2/1968 | Mercur | 229/68 R |
| 4,473,153 | 9/1984 | Colangelo | 229/68 R |
| 4,708,285 | 11/1987 | Segall | 229/70 |
| 4,715,531 | 12/1987 | Stewart et al. | 229/73 |

Primary Examiner—Willis Little
Attorney, Agent, or Firm—Handal & Morofsky

[57] ABSTRACT

An envelope form for a computer storage member such as a floppy disk having a number of named computer files recorded thereon is disclosed. It comprises a sheet form configured and dimensioned to be fed into a printer. A directory printing surface portion substantially coincides with the area where a computer normally drives a printer to print a directory listing of the names of the files. Marks are positioned on the sheet form and are configured and dimensioned to define an envelope blank having a front panel and a rear panel. The panels substantially coincide with the directory printing surface portion. An envelope closing extension is associated with and is substantially adjacent to one of the panels. The envelope closing extension is positioned, configured, and dimensioned to be folded over to close an open side of an envelope body formed by the folding of the front panel over the rear panel. An adhesive layer is disposed on at least a portion of the envelope closing extension to keep the envelope closing extension folded over.

11 Claims, 2 Drawing Sheets

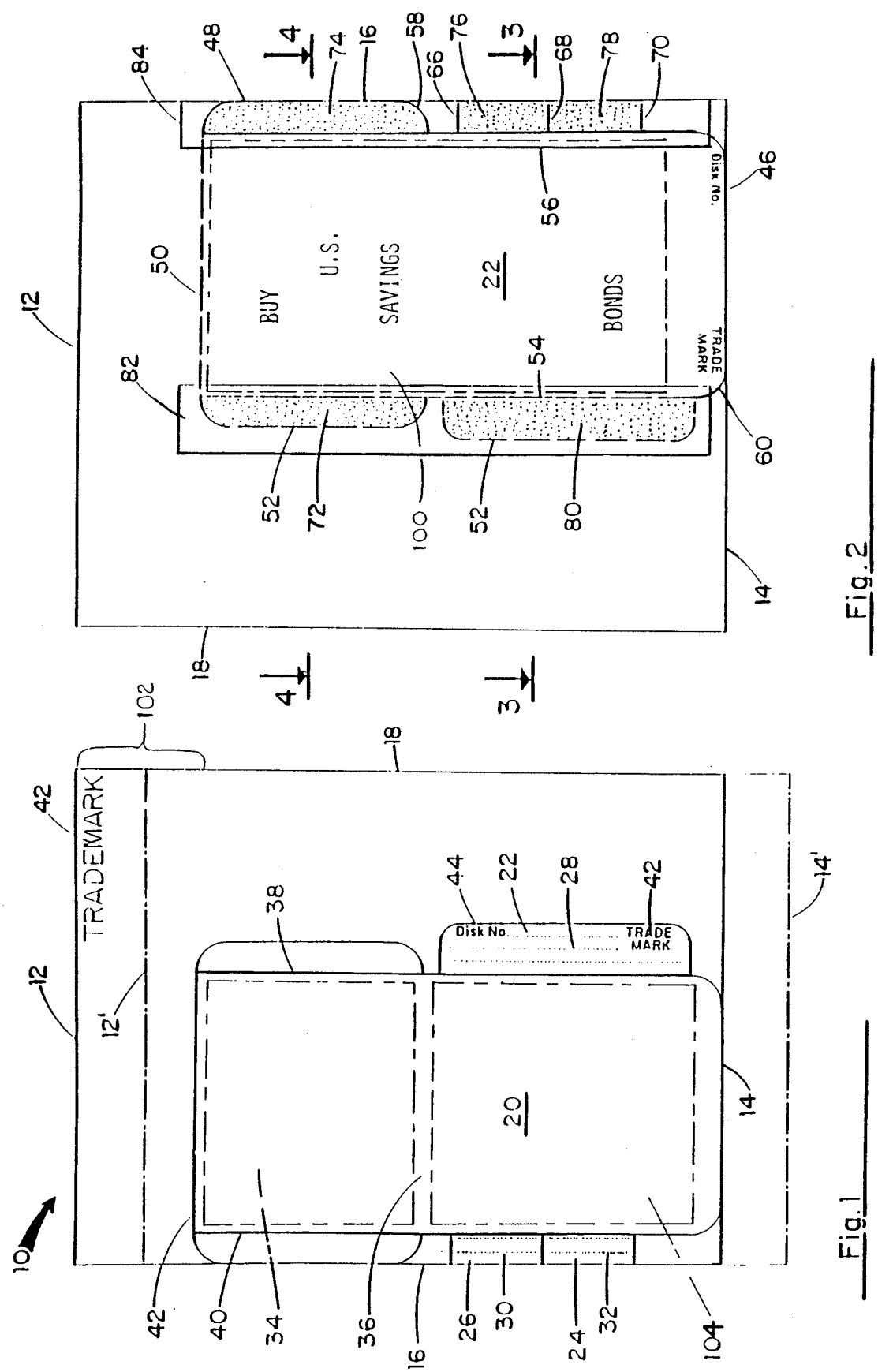

FLOPPY DISK DIRECTORY ENVELOPE FORM

CROSS REFERENCE TO RELATED APPLICATION

This application is a continuation of application Ser. No. 119,137, filed 11/10/89 now abandoned, which is a continuation in part of United States application Ser. No. 860,500, filed on May 7, 1986 and issued as U.S. Pat. No. 4,708,285.

TECHNICAL FIELD

The invention relates to forms useful for being imprinted with a directory and foldable into an envelope for containing a floppy disk.

BACKGROUND

Recent years have seen extensive growth in the use of the floppy disk as a medium for storing data, information, programs and the like. In the case of personal computers, most often the information stored on a disk takes the form of a number of documents or programs each having a name and perhaps, a subname taking the form "name.subname" where the name is limited to eight alphanumeric symbols and the subname is limited to three alphanumeric symbols.

Naturally, by mere visual inspection of a disk, it is not possible to ascertain the identity of the various items of information recorded thereon. Accordingly, floppy disks are generally provided with a plurality of stick-on labels which are made of paper and a self-adhesive material on one side. The purpose of these labels is to provide a surface for writing notations respecting the file or program contents of a disk and to be adhered directly to the disk. Typically one takes one of these labels and adheres it to the floppy disk and then annotates the label with the various file or program names. As this information changes, the label may be marked up further, until ultimately, there is no room left on the label. At this point, the user takes a new label, adheres it over the old label or on another place on the floppy disk and continues the process. This process suffers a number of obvious and unobvious inadequacies.

Firstly, the labels are generally adhered to the disk prior to being written on. Accordingly, they must by written on by hand as floppy disks are not, at the present time, capable of being put through a typewriter without a serious likelihood of damage to the information stored thereon. Because handwriting is often illegible, the contents of the disk may not be legible to later users of the disk.

In addition to the problem of illegibility of handwriting, there also exits the problem that the application of numerous stickers to a disk will cause it to have an unsightedly appearance, present an obstruction to placing the disk in its drive and, indeed, finally to clutter the file in which the disks are stored.

Furthermore, disks are very often damaged when they are written on. Ball point pen, pencils and roller ball markers are particularly likely to damage disks. Felt tip markers are preferred for marking a label which is already adhered to a disk.

Finally, labels have limited area and, in practice, there is seldom more than enough room to enter the name of the disk and the date on which it is made. This, combined with the fact that the operator may become impatient and careless with the time necessary for writing on a disk, often results in abbreviated and unrecognizable notes on disks. One solution to this problem is to instruct the computer to print out a directory of disk file/program information on a separate piece of paper which is then cut and folded to fit inside the envelope within which the floppy disk is normally contained. While this approach does solve the problem of complete and legible descriptions which are made with a minimum of operator effort, it introduces a serious bulk problem in filing of floppy disks and introduces the possibility that a directory may fall from an envelope and become associated with the wrong disk. Obviously, this could result in loss of valuable data or programming.

SUMMARY OF THE INVENTION

The invention, as claimed, is intended to provide a remedy. It solves the problem of how to label a floppy disk envelope with the disk electronic contents without substantial operator effort and link the disk to the envelope, in a minimum of time and with complete and legible contents.

The above is achieved by providing a form having a stock paper size and having perforations or the like which define a predetermined shape capable of being folded into an envelope for containing a floppy disk. Perforations or the like are disposed in positions with respect to the stock paper size such that the envelope (which the perforations define when folded into completed form) includes a labelling area which coincides (in the unfolded, unseparated form) with the normal printing field produced by a computer printing a standard one column or multiple column directory such as that printed using the MS-DOS TM system. Of course this form can be adapted to be compatible with any other disk operating system capable of printing a directory table of file contents or catalogue or word processing or other program having this capability. In order to securely assemble the inventive envelope, self-adhesive material and protective release agent surfaced materials are provided therefor at points on the shape to be cut out where adhesive is required to maintain the shape of the assembled envelope.

Additional adhesive ma be provided on other parts of the form which may also be perforated, scored or cut to define labels. A degree of protection from misassociation of envelopes and disks is provided by similarly color-coding and/or numbering adhesive disk labels and envelopes.

BRIEF DESCRIPTION OF DRAWINGS

One way of carrying out the invention is described in detail below with reference to drawings which illustrate only one specific embodiment, in which:

FIG. 1 is a plan view of the information receiving portion of the form of the present invention;

FIG. 2 is a plan view of the reverse of the form illustrated in FIG. 1 in which the position of the top and bottom of the form has been maintained and the right and left edges of the form have been reversed;

DETAILED DESCRIPTION

Figure 5:
FIG. 5 is a view of a small label for adhesion onto a floppy disk.

Referring to FIG. 1, the front of an envelope form 10 constructed in accordance with the present invention is illustrated. Envelope form 10 has a top edge 12, a bottom edge 14, a left edge 16 and a right edge 18. It is contemplated that the dimensions of the form, that is to say length of the left edge and the width of the top edge preferably define a standard stock size paper typically, eight and one-half inches by eleven inches.

Printed on the front of the form in a particular color of ink which is used on both sides of a given form and which may be varied from form to form for organizational or identification purposes are a plurality of indicia. These indicia generally define an envelope blank 20 and a number of labels 22, 24 and 26. The labels have printed matter 28, 30 and 32 disposed thereon in the particular selected ink color. The printed matter on these labels is contemplated, in accordance with the preferred embodiment, to include a number or name identifying the disk. Disposed on form 10 is the envelope blank which is defined by perforations which allow it to be separated from blank form 10. The perforations also allow the separation of labels 22-26, as will be described in detail in connection with FIG. 2.

It is contemplated that the form will include a field 34 on which a directory titles or index of contents of a given disk, will be printed using system commands or software utilities by simple insertion of the form into the printer. In the event that one wishes to use a printer with an automatic paper feeding attachment, the printing start point cannot be user defined and, accordingly, it may be desirable to shift the position of the envelope blank 20 upwardly. This is diagramatically illustrated in phantom lines in FIG. 1, if one considers the position of blank 20 on a paper having a top edge 12' and a bottom edge 14'. Generally, it is contemplated that different printers may require special form arrangements.

Folding of the envelope into form may be facilitated by the optional addition of score lines 36, 38 and 40. In the alternative, the score lines may be replaced by simple printed indicia indicating where folding is to occur. Finally, in order to provide some kind of association between disks bearing labels 22 and the particular envelope, the trademark 42 of the maker may be imprinted at various positions in the particular color of ink selected. In addition, an alphanumeric designation 44 on label 22 may be used to associate a disk (through the adhesion of label 22 to a disk) with an envelope which also bares the same alphanumeric designation as illustrated at numeral 46 in FIG. 2.

FIG. 2 also illustrates the perforations provided in accordance with the preferred embodiment. Generally, the envelope blank 22 is defined by a partial side edge 48, and perforations 50, 52, 54, 56, 58 and 60. Label 22 is defined by perforations 54 and 62. Labels 24 and 26 are defined by perforation 56 side edge 64 and perforations 66, 68 and 70.

The form illustrated in FIG. 2 has several self-adhesive layers placed thereon, including, adhesive layers 72 and 74 which serve to secure the envelope in its folded position and adhesive layers 76, 78 and 80 which serve to provide an adhesive backing to labels 26, 24 and 22.

Figure 3:
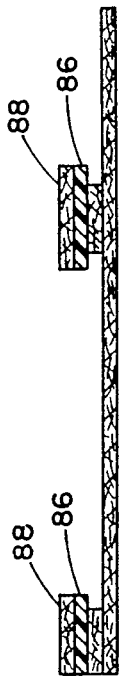
FIG. 3 is a view along line 3—3 of FIG. 2.
Figure 4:
FIG. 4 is a view along line 4—4 of FIG. 2.

Finally, the self-adhesive layers are protected from dust and unintentional sticking by protective tabs 82 and 84 which are coated on the their undersides (i.e. The sides which contact the adhesive) with a release agent 86 such as wax, or teflon. This aspect of the invention can be seen more clearly in FIGS. 3 and 4 in which thicknesses have been greatly exaggerated. It is noted that the base for release agent 86 may be any suitable material such as paper substrate 88. The separated labels are illustrated individually in FIGS. 5 and 6.

Figure 7:
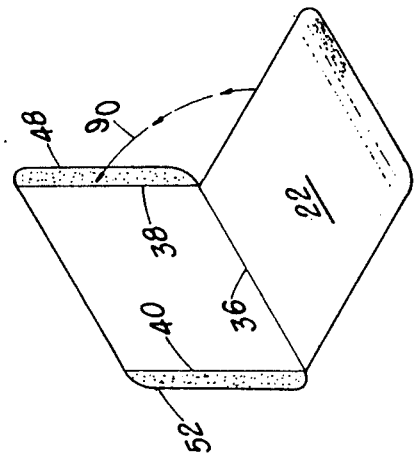
FIG. 7 is a view showing the folding of the form which forms the envelope after the removal of other material and in a partially folded condition.

The inventive envelope in a stage of partial assembly is illustrated in FIG. 7. Here all the material except for the envelope blank 20 has been removed and the blank has been folded along score line 36. This folding operation is continued in the direction of arrow 90 until the envelope takes the form illustrated in solid lines in FIG. 8. Tabs 92 and 94 are then folded onto the back of the partially assembled envelope illustrated in FIG. 8, thus forming a pocket with the tabs 92 and 94 in the position illustrated in dash-dot phantom lines in FIG. 8.

The form includes an advertising area 100 which can bear a commercial message. When it is desired to use the inventive form 10, one simply inserts the form 10 into a printer and instructs the computer to print the directory in accordance with standard practice for the particular disk operating system employed. Once this has been done the printed directory 96 will take the position illustrated by field 34 in FIG. 1. It is noted that the inclusion of header area 102 allows all of area 34 to be used as a listing space. The envelope blank 20 is then removed by breaking the perforations and folded a indicated in FIGS. 7 and 8 to form a pocket by first folding along score line 36 and then folding tabs 92 and 94 over the opposite side of envelope blank 20 by folding them along score lines 38 and 40. This covers the advertising in area 100, retaining the quality appearance of the product.

Figure 6:
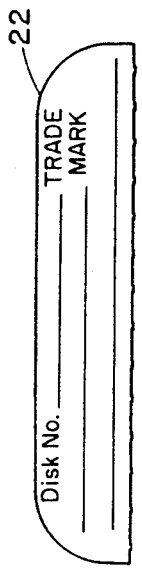
FIG. 6 is a view of a large label for adhesion onto a floppy disk or onto an envelope, manila folder, or tab of a separator in a ring binder or other catagorizing or organizational device.
Figure 8:
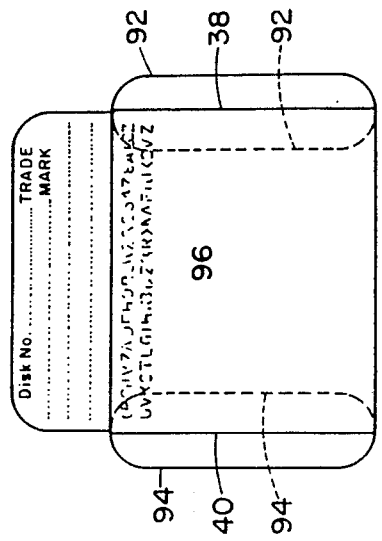
FIG. 8 illustrates the envelope after folding has been completed.

At this point the disk number or name is annotated and identified as is indicated in the finished envelope illustrated in FIG. 8 and label 22 bearing the same annotated identification and the same color as illustrated in FIG. 6 is adhered to the floppy disk and the floppy disk inserted into the envelope with label 22 showing.

While an illustrative embodiment of the invention has been described, it is, of course understood that various modifications may be made. For example, it is possible to replace protective tabs 82 and 84 with an 8½ inch by 11 inch protective sheet which overlies the form and have cut out form elements adhered to the sheet, thus eliminating the need to rip perforations. Instructions may be printed on area 104. Extra material may also be added to the form to provide a feeder leader or the like. In addition, forms may be put on continuous perforated accordian folds or they may be padded together at one edge for easy use. Such modifications are within the spirit and scope of the invention which is limited and defined only by the appended claims.

I claim:

1. An envelope form for a computer storage member of the type having a number of computer files recorded thereon, said files having names and said computer storage member being of the type which is readable using a computer system programmed with a program having a the capability of causing said computer to drive a printer to print a directory listing of said names of said files recorded on said computer storage member on a sheet of paper with said directory listing positioned in a particular area on said sheet, comprising a sheet form configured and dimensioned to be fed into said printer and having a directory printing surface portion which substantially coincides with said particular area, marks positioned on said sheet form, said marks being configured and dimensioned to define an envelope blank having a front panel and a rear panel, said rear panel being disposed substantially adjacent to said front panel, said front and rear panels being disposed on said sheet at positions which substantially coincide with said directory printing surface on said sheet form and said panels having configurations and dimensions to substantially coincide with said particular area, an envelope closing extension associated with and substantially adjacent to one of said panels, said envelope closing extension being positioned, configured, and dimensioned to be folded over to close an open side of an envelope body formed by the folding of said front panel over said rear panel and an adhesive layer disposed on at least a portion of said envelope closing extension for keeping said envelope closing extension folded over.

2. An envelope form for a computer storage member as in claim 1, wherein said marks comprise printed marks.

3. An envelope form for a computer storage member as in claim 1, wherein said marks comprise a plurality of perforations.

4. An envelope form for a computer storage member as in claim 1, further comprising printed indicia defining boundaries between said front panel, said rear panel, and said extension.

5. An envelope form for a computer storage member of the type having a number of computer files recorded thereon, as in claim 1, wherein said rear panel is substantially rectangular in shape and has an edge in facing relationship to the edge of the front panel which enters the printer during feeding of the sheet during a printing cycle and a rear panel is disposed adjacent to front panel at a position where the rear panel enters the printer after the front panel during a feeding cycle of said printer.

6. An envelope form for a computer storage member as in claim 1, wherein said envelope form is printed with ink in a color which appears on the front panel and further comprising a label portion positioned adjacent a form blank formed by said front panel, said rear panel, and said extension, with the label portion being printed with ink in said color.

7. An envelope form for a computer storage member as in claim 1, wherein an identification number appears on a label defined in said sheet form.

8. An envelope form for a computer storage member as in claim 1, further comprising a label portion adjacent one of said panels or said extension.

9. An envelope form for a computer storage member as in claim 1, further comprising an additional extension.

10. An envelope form for a computer storage member as in claim 9, wherein said extensions are disposed on opposite sides of the same panel.

11. A method of enveloping a computer storage member of the type having a number of computer files recorded thereon, said files having names and said computer storage member being of the type which is readable using a computer system programmed with a program having the capability of causing said computer to drive a printer to print a directory listing of said names of said files recorded on said computer storage member on a sheet of paper with said directory listing positioned in a particular area on said sheet, with an envelope form comprising the steps of providing a sheet form which has been configured and dimensioned to be fed into said printer and has a directory printing surface portion which substantially coincides with said particular area, positioning marks on said sheet form, said marks being configured and dimensioned to define an envelope blank having a front panel and a rear panel, with said rear panel being disposed substantially adjacent to said front panel, said front and rear panels being disposed on said sheet at positions which substantially coincide with said directory printing surface on said sheet form and said panels having configurations and dimensions to substantially coincide with said particular area, defining an envelope closing extension associated with and substantially adjacent to one of said panels, said envelope closing extension being positioned, configured, and dimensioned to be folded over to close an open side of an envelope body formed by the folding of said front panel over said rear panel, disposing an adhesive layer on at least a portion of said envelope closing extension for keeping said envelope closing extension folded over, taking said form and placing it in said computer printer, taking said computer storage member and placing it into a reading device on said computer, causing a program in said computer to read the names of data files on said computer storage member and print on said directory printing surface the names of said computer files, forming said form into an envelope, adhering said extension to secure the form of said envelope, removing said computer storage member from said computer and placing said computer storage member in said envelope.

* * * * *